United States Patent
Hrehor et al.

(10) Patent No.: US 12,493,351 B2
(45) Date of Patent: Dec. 9, 2025

(54) SYSTEM AND METHOD FOR ZONED HAPTIC KEYBOARD

(71) Applicant: Dell Products, LP, Round Rock, TX (US)

(72) Inventors: Robert D. Hrehor, Round Rock, TX (US); Brandon J. Brocklesby, Pflugerville, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/224,347

(22) Filed: Jul. 20, 2023

(65) Prior Publication Data
US 2025/0028393 A1    Jan. 23, 2025

(51) Int. Cl.
G06F 3/01   (2006.01)
G06F 3/023  (2006.01)
G06F 3/041  (2006.01)

(52) U.S. Cl.
CPC ............ *G06F 3/016* (2013.01); *G06F 3/023* (2013.01); *G06F 3/04144* (2019.05)

(58) Field of Classification Search
None
See application file for complete search history.

(56) References Cited

U.S. PATENT DOCUMENTS

| | | |
|---|---|---|
| 2012/0113008 A1 | 5/2012 | Makinen |
| 2013/0128587 A1* | 5/2013 | Lisseman ............... B60K 35/10 |
| | | 362/276 |
| 2013/0307441 A1* | 11/2013 | Schuster ............... H02P 25/032 |
| | | 318/127 |
| 2015/0185842 A1* | 7/2015 | Picciotto ............. G06F 3/04144 |
| | | 345/173 |
| 2016/0202760 A1 | 7/2016 | Churikov |
| 2017/0336903 A1 | 11/2017 | Rivaud |
| 2018/0218859 A1* | 8/2018 | Ligtenberg ......... H03K 17/9622 |
| 2019/0094973 A1* | 3/2019 | Miller ..................... G06F 3/041 |
| 2019/0250666 A1 | 8/2019 | Klein |
| 2020/0110471 A1 | 4/2020 | Platt |
| 2021/0096613 A1 | 4/2021 | Peeler |
| 2022/0043567 A1 | 2/2022 | Dunton |
| 2022/0176241 A1 | 6/2022 | Goh |
| 2022/0362663 A1 | 11/2022 | Bryan |

(Continued)

*Primary Examiner* — Nitin Patel
*Assistant Examiner* — Sarvesh J Nadkarni
(74) *Attorney, Agent, or Firm* — Prol Intellectual Property Law, PLLC; H. Kenneth Prol

(57) ABSTRACT

An information handling system including a zoned haptic keyboard comprising a keyboard controller transmitting key actuation data to the hardware processor indicating which key of a plurality of keys was detected as being actuated by a user via a force sensing integrated circuit (IC) to detect force data within a first haptic zone. The first haptic zone includes a group of keys and is one of a plurality of haptic zones partitioned across an area of the zoned haptic keyboard. A haptic device controller activates, based on the key actuated and its haptic zone, a first zoned haptic actuator operatively coupled to a haptic zone section of a haptic zone plate to provide haptic feedback within the first haptic zone, wherein the haptic zone section of the zoned haptic plate is haptically isolated from other haptic zone sections to haptically isolate the first haptic zone in the zoned haptic keyboard.

20 Claims, 8 Drawing Sheets

(56) References Cited

U.S. PATENT DOCUMENTS

| | | |
|---|---|---|
| 2022/0382340 A1 | 12/2022 | Peeler |
| 2023/0142264 A1* | 5/2023 | Lehmann .............. G06F 3/0414 |
| | | 345/168 |
| 2023/0154293 A1* | 5/2023 | Liu ........................ G06F 3/021 |
| | | 340/407.1 |
| 2024/0248535 A1* | 7/2024 | Qi .......................... G06F 3/016 |

* cited by examiner

SYSTEM AND METHOD FOR ZONED HAPTIC KEYBOARD

FIELD OF THE DISCLOSURE

The present disclosure generally relates to haptic feedback provided at a keyboard. The present disclosure more specifically relates to haptic feedback to a user during operation of an input device associated with an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include a keyboard used by the user to provide input to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
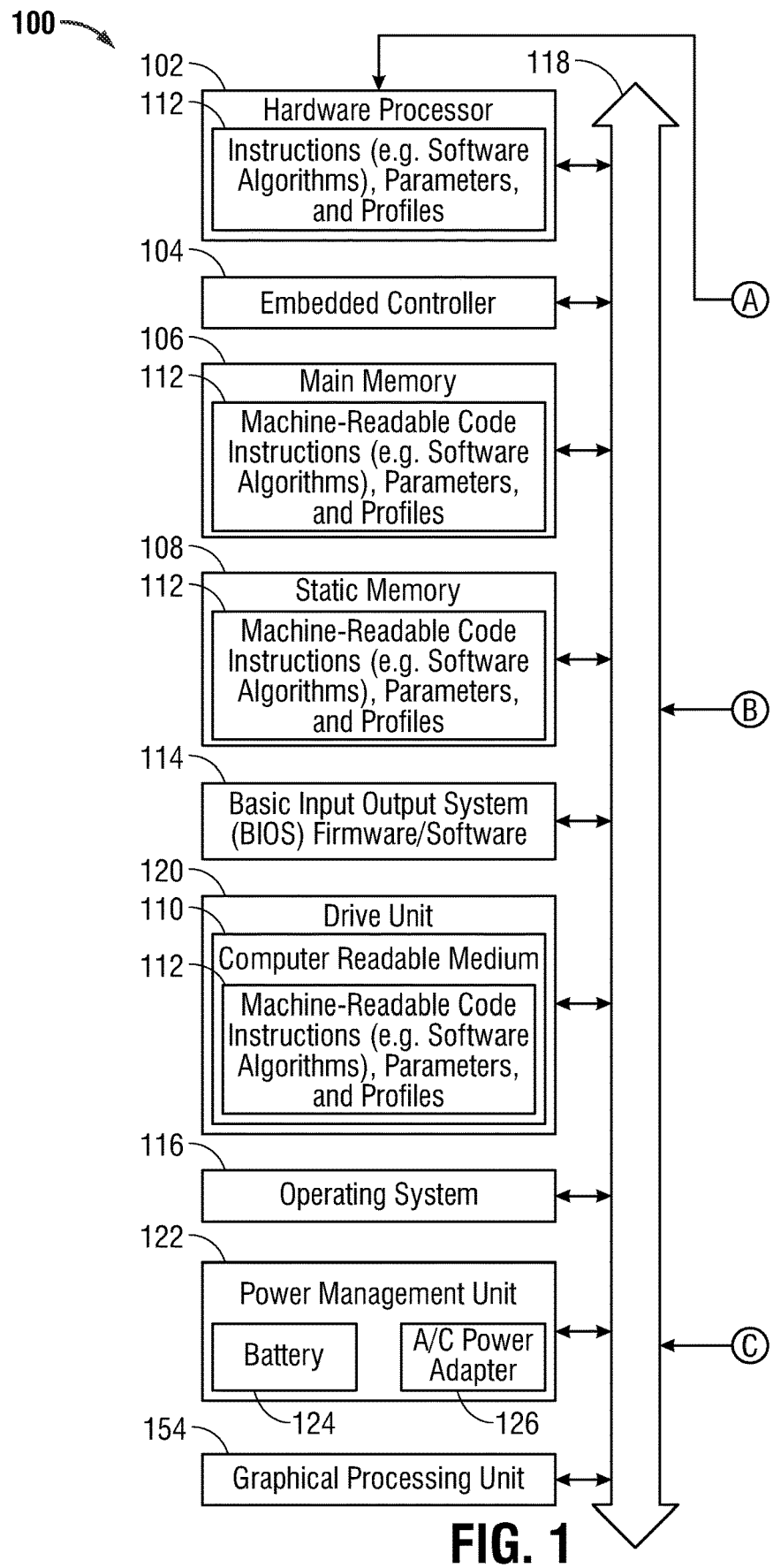
FIG. 1 is a block diagram illustrating an information handling system with a zoned haptic keyboard according to an embodiment of the present disclosure.
Figure 1:
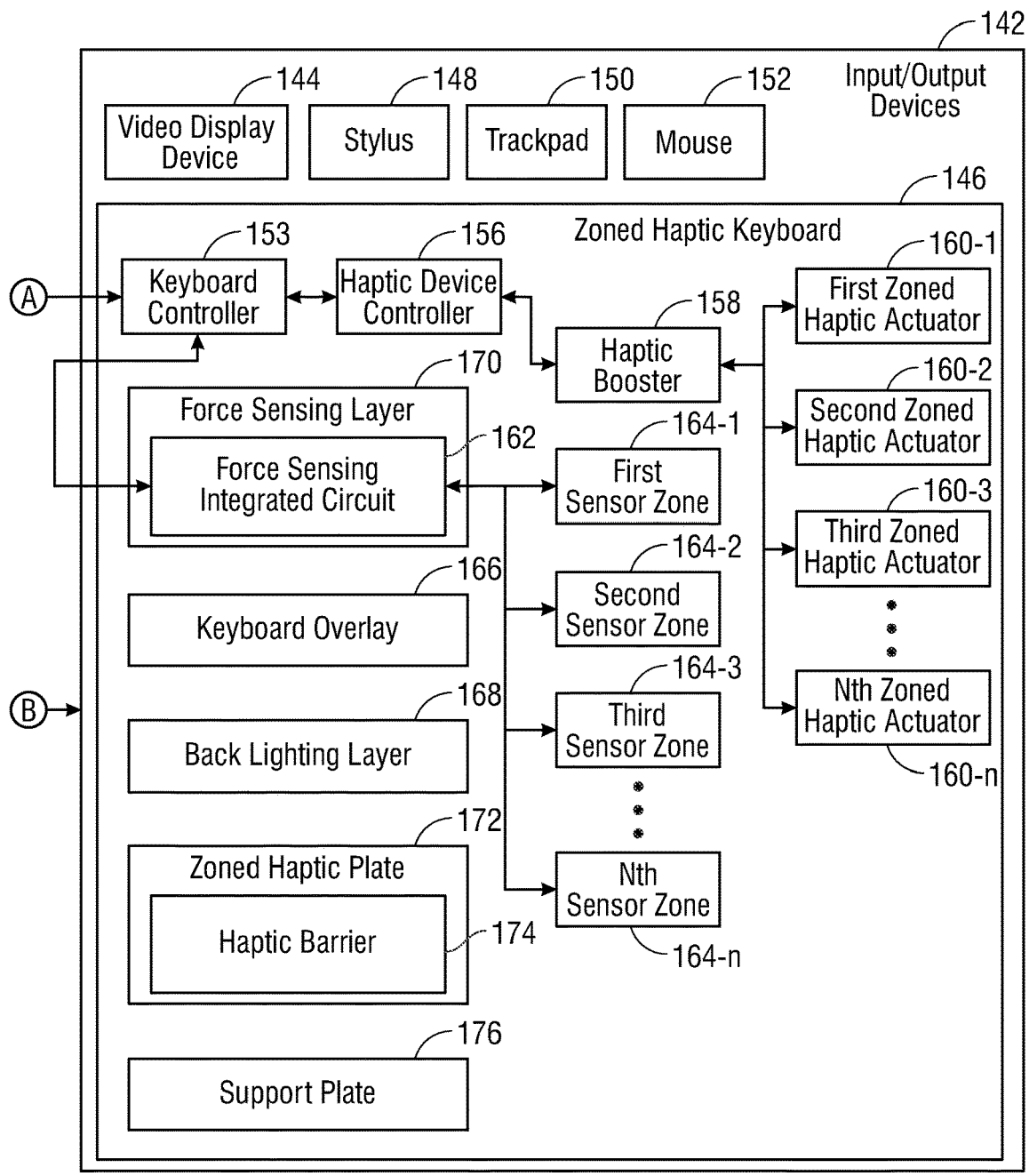
Figure 1:
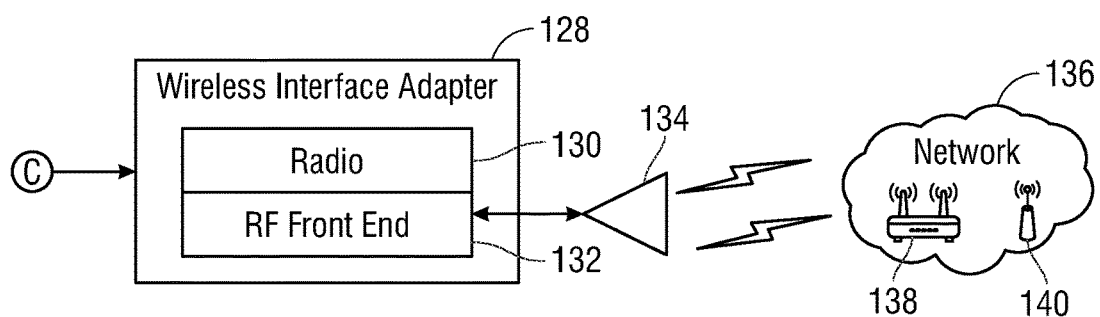

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Input devices such as a mouse, a keyboard, or a stylus, allow a user to interface with an information handling system and provide input. When using a keyboard, for example, the user may press or actuate a number of keys on the keyboard in order to provide alpha-numeric input to the information handling system. This alpha-numeric input may allow the user to interact with a plurality of different kinds of applications being executed on the information handling system. Traditional keyboards include, for example, a number of mechanical parts that provide the user with the sensation of a key press. One of these mechanical pieces may include a rubber dome, for example, that give the user a force feedback or haptic force when a key is pressed. These parts, however, may mechanically degrade over time and fail thereby creating additional costs associated with the operation of the information handling system. Other mechanical parts may also be used that may also cause noises to emanate from the keyboard when the user actuates the keys. This noise may also be distracting and annoying to the user after, potentially, hours of typing.

In order to alleviate these issues, some information handling systems include haptic actuators and systems that, when the user actuates a key, simulates that haptic feedback that would have been felt using a mechanical device at each key. By including a haptic actuator under each key, the cost of manufacturing increases. Still further, with the increase in the number of haptic actuators within the keyboard, the number of potential failure points also increases. To alleviate this issue, other haptic keyboards have been made that use sound as a feedback mechanism. However, this not only creates a noisy environment but also fails to provide a haptic feedback to the user. Indeed, sound does not provide the same quality of feedback for the typist and studies have shown that the typing speed are reduced when only using sound as the feedback mechanism.

In other information handling systems, in order to alleviate these issues, some manufacturers have developed video display devices that provide the capability of providing input via soft keys presented on the display. In these cases, a single haptic actuator is used to provide haptic feedback whenever a single input is provided. This does not, however, provide the haptic feeling to a user that individual keys are being actuated.

The present specification describes an information handling system that includes zoned haptic keys of a zoned haptic keyboard. The information handling system may include a hardware processor, a memory device, a keyboard that is a zoned haptic keyboard, and a power management unit (PMU to provide power to the hardware processor and memory device. The zoned haptic keyboard may include a keyboard controller to transmit key actuation data to the hardware processor indicating which key of a plurality of keys within the keyboard was detected as being actuated by a user. The zoned haptic keyboard may also include a force sensing integrated circuit (IC) to detect force data at one of a plurality of force sensors formed within one of a plurality of force sensing zones partitioned across an area of the keyboard. Still further, the zoned haptic keyboard may include a haptic device controller to receive instructions from the keyboard controller indicating, based on the force data received at the keyboard controller from the force sensing IC, which of a plurality of zoned haptic actuators to generate haptic feedback to a user with the force sensor at the haptic feedback zone where the force data was detected. In an embodiment, the zoned haptic actuator of the plurality of zoned haptic actuators that is to be activated is within one of the plurality of force sensing zones for the haptic zones partitioned across an area of the zoned haptic keyboard where the force sensing IC detected the force data.

Embodiments of the present disclosure provide for the force sensing IC to include, for example, a piezoelectric-based force sensor, a strain gauge, a capacitive force sensor, a resistive force sensor, a force sensing film, and the like to detect a keystroke from a user at specific keys across the keyboard. Where keystrokes are detected, a keyboard controller may receive this input data and concurrently transmit the input data to the hardware processor of the information handling system and to a haptic device controller. The haptic device controller may then actuate a zoned haptic actuator within a haptic zone of keys where the detected key that is pressed is located on the zoned haptic keyboard. In an embodiment, the haptic zone defined across a zoned haptic keyboard may include a plurality of keys on the keyboard that have been partitioned off from other plurality of keys that are also within their own force sensing haptic zone based on keyboard touch for finger position in a zoned haptic keyboard.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 154, hardware processor 102, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as a zoned haptic keyboard 146, a trackpad 150, a mouse 152, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 180, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 154, or any other processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wireless communication with the zoned haptic keyboard 146 and/or other I/O devices 142 such as a mouse 152, video display device 144, stylus 148, or trackpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. Additionally, as described herein, the information handling system 100 may include one or more other I/O devices 142 that allow the user to interface with the information handling system 100 via the video/graphics display device 144, such as a cursor control device (e.g., the mouse 152, trackpad 150, or gesture or touch screen input), a stylus 148, and/or the zoned haptic keyboard 146 described herein, among others. Various drivers and control electronics may be operatively coupled to operate the I/O devices 142 according to the embodiments described herein.

A network interface device of the information handling system 100 shown as wireless interface adapter 128 can provide connectivity among devices such as with Bluetooth® (e.g., 2.4 GHz) or to a network 136, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof. In an embodiment the wireless interface adapter 128 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication. The RF subsystems and radios 130 and include wireless controllers to manage authentication, connectivity, communications, power levels for transmission, buffering, error correction, baseband processing, and other functions of the wireless interface adapter 128.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video or data over the network 136. Further, the instructions 112 may be transmitted or received over the network 136 via the network interface device or wireless interface adapter 128.

The information handling system 100 may include a set of instructions 112 that may be executed to cause the computer system to perform any one or more of the methods or computer-based functions disclosed herein. For example, instructions 112 may be executed by a hardware processor 102, GPU 154, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

As described herein, the information handling includes a zoned haptic keyboard 146. The zoned haptic keyboard 146 may be operatively coupled to the information handling system 100 (and the hardware processor 102) via a wired connection, a wireless connection (e.g., via the wireless interface adapter 128, radio 130, RF front end 132, and antenna 134), or may be a built-in zoned haptic keyboard 146 (e.g., a laptop-type built in keyboard). In an embodiment, the zoned haptic keyboard 146 may be a QWERTY keyboard. However, the present specification contemplates that other types of keyboards may be used with other layouts of keys and other input buttons arranged in various combinations and in various languages. For ease of description and understanding, however, the present specification will describe the zoned haptic keyboard 146 as at least including a QWERTY-type keyboard.

It is also appreciated that the zoned haptic keyboard 146 provides haptic output such that a user may feel that a key has been pressed or actuated when the user applies a force to the any given key. As described herein, the haptic feedback may be provided via activation of one of a plurality of zoned haptic actuators 160-1, 160-2, 160-3, 160-*n*. The zoned haptic actuators 160-1, 160-2, 160-3, 160-*n* may be arranged within haptic zones of the zoned haptic keyboard 146 to provide haptic feedback to the user at their respective haptic zones partitioned across the zoned haptic keyboard 146.

In an embodiment, these haptic zones may be defined by the finger touch location zones for each of multiple fingers on a zoned haptic keyboard 146 used by a user when engaging in touch-type on the QWERTY-type zoned haptic keyboard 146. Touch typing is a style of typing that, when executed properly by the user, uses a single finger to actuate a particular zone of keys and this may define a finger touch zone to coincide with a haptic zone. For example, on a QWERTY-type keyboard, a user may place their fingers along a home row of keys with the pointer finger of the user's left hand resting on the "f-key" and the pointer finger of the user's right hand resting on the "j-key." The rest of the fingers will rest on the remaining "home-row" keys (e.g., left hand fingers at the f, d, s, and a keys and right-hand fingers at the j, k, 1 and; keys). This aligns each finger with their appropriate finger touch zone of keys on this QWERTY-type keyboard. It is these finger touch zone of keys that, in an example embodiment, are the designated as haptic zones where one of the plurality of zoned haptic actuators 160-1, 160-2, 160-3, 160-*n* are placed under and on zoned haptic plate sections of a zoned haptic plate 172 to actuate a finger touch zone of keys where a single finger may press a key in a key group for that finger during touch-typing. For example, the haptic zone for the user's left hand pointer finger includes the following keys: f, r, v, g, t, b, 4, and 5. This haptic zone, defined by these keys a user's left pointer finger will touch forms, in an example embodiment, a first haptic zone where a first zoned haptic actuator 160-1 is placed under the keys in zoned haptic keyboard 146. During operation, therefore, where any of these keys in the first haptic zone are actuated by the user, the first zoned haptic actuator 160-1 may be activated to provide haptic feedback to the user across this first haptic zone. As a consequence, a single zoned haptic actuator 160-1, 160-2, 160-3. 160-*n* (in this example, the first zoned haptic actuator 160-1) is used for multiple keys in a group in a haptic zone associated with a first sensor zone 164-1 on the zoned haptic keyboard 146. This significantly reduces the number of actuators necessary to provide haptic feedback to the user thereby reducing the costs associated with manufacturing the zoned haptic keyboard 146 as well as reducing the number of potential devices that may fail over time and use by the user.

As a second example, a second haptic zone may be formed at the user's right hand pointer finger. Because this finger is used to actuate the j, u, m, h, y n, 6, and 7 keys, this defines a second haptic zone formed across the zoned haptic keyboard 146. Again, this second haptic zone may also include one of the zoned haptic actuators 160-1, 160-2, 160-3, 160-*n* which in this example is a second zoned haptic actuator 160-2. The second haptic zone with a second haptic actuator 160-2 corresponds with a second sensor zone 164-2 as well. Thus, for each set of keys grouped in a finger touch zone of keys that each of the user's fingers are responsible to actuate in a touch-typing manner, a haptic zone is formed with each of these haptic zones including a zoned haptic actuator 160-1, 160-2, 160-3, 160-*n* (e.g., a first zoned haptic actuator 160-1, a second zoned haptic actuator 160-2, a third zoned haptic actuator 160-3, and an Nth zoned haptic actuator 160-*n*) and associated with a sensor zone (e.g., first sensor zone 164-1, second sensor zone 164-2, third sensor zone 164-3, and an nth sensor zone 164-*n*) until the entire zoned haptic keyboard 146 is partitioned by haptic zones with each haptic zone including at least one zoned haptic actuator 160-1, 160-2, 160-3, 160-*n* used to provide haptic feedback to the user.

It is appreciated that some haptic zones partitioned across the zoned haptic keyboard 146 may include more grouped keys or cover more area of the zoned haptic keyboard 146 than other zones. For example, a user's left pinky finger may be responsible, when using touch-typing, for actuating a finger touch zone including the a, z, q. 1, ', tab, caps, shift, and Ctrl keys. These may be lesser-used keys for example. Not only does this haptic zone of keys include more keys than some other haptic zones, the size of these keys and the area of the zoned haptic keyboard 146 they encompass is larger than other haptic zones formed across the zoned haptic keyboard 146. In such an embodiment, this haptic zone may include multiple zoned haptic actuators 160-*n* to provide sufficient haptic feedback to these larger haptic zones so that a user may feel this haptic feedback that simulates the feel of the actuation of any of these keys in this haptic zone formed.

The zoned haptic keyboard 146 further includes a keyboard controller 153 used to receive input from one or more force sensors each at a sensor zone 164-1, 164-2, 164-3, 164-*n* corresponding to the above haptic zones of the zoned haptic keyboard 146. The force sensors may be any type of device that detects the actuation of a key by user. In an embodiment, these force sensors may form part of a force sensing integrated circuit (IC) 162 with force sensing elements or a force sensing layer that receives this input from the force sensors and transmits this data to the keyboard controller 153. The force sensing IC 162 and the force sensors may be formed onto a force sensing layer 170 that is placed below a keyboard overlay 166 with the individual keys formed on the keyboard overlay 166. The force sensing layer 170 may be any substrate or set of substrate layers that is positioned or houses a plurality of force sensors under each key so that, when actuated by a user, the actuation of a key is detected based on force applied. In an embodiment, the sensors in force sensing layer 170 may include strain gauges, force sensing films, piezo-resistive-based force sensors, capacitive force sensors, and resistive force sensors, among other types of force sensors.

The zoned haptic keyboard 146 also includes a haptic device controller 156 that controls the activation of one or more zoned haptic actuators 160-1, 160-2, 160-3, 160-*n* for the haptic zones described herein in embodiments. In an embodiment, the haptic device controller 156 may be operatively coupled to a haptic booster 158. The haptic booster 158 may be any device that boosts the voltage provided to each of the zoned haptic actuators 160-1, 160-2, 160-3, 160-*n* corresponding to each of the haptic zones of the zoned haptic keyboard 146. The haptic booster 158 (also known as a flyback circuit) may increase the voltage applied to each of the zoned haptic actuators 160-1, 160-2, 160-3, 160-n so that the proper amount of haptic feedback is felt by the user at each of the haptic zones within the zoned haptic keyboard 146. The haptic device controller 156 may by any hardware processing device used to haptically control the zoned haptic actuators 160-1, 160-2, 160-3, 160-n.

The zoned haptic keyboard 146 may also include a zoned haptic plate 172 with plural haptic zones. The zoned haptic plate 172 may be a substrate that has each of the zoned haptic actuators 160-1, 160-2, 160-3, 160-n operatively coupled at their respective haptic zone locations under the haptic zones on corresponding haptic zone sections of a zoned haptic plate 172 in embodiments herein. In an embodiment, the zoned haptic plate 172 may be made of a material such as a metal. The metal of the zoned haptic plate 172 may be semi-flexible to allow each zoned haptic actuator 160-1, 160-2, 160-3, 160-n for each haptic zone to apply a force against the respective haptic zones while also allowing for vibration to occur so that the user may feel the haptic feedback after actuation of a key on the zoned haptic keyboard 146.

The zoned haptic plate 172 may also include one or more haptic barriers 174. The haptic barriers 174 may be formed between the haptic zone sections of the zoned haptic plate 172 under the keyboard overlay 166 and any other layer or substrate between the zoned haptic plate 172 and the keyboard overlay 166. The haptic barriers 174 may be made of a vibration absorbing material such as an elastomer. The haptic barrier 174, in an embodiment, may be used to prevent the haptic feedback produced by each of the zoned haptic actuators 160-1, 160-2, 160-3, 160-n within their respective haptic zone sections of the zoned haptic plate 172 from being felt by the user at another haptic zone over the zoned haptic plate 172. For example, the haptic barrier 174 may be formed between a haptic zone section of the zoned haptic plate 172 for those keys that are to be pressed by the user's left hand pointer finger and a haptic zone section of the zoned haptic plate 172 for those keys that are to be pressed by a user's right hand pointer finger when engaged in touch-typing.

In an embodiment the zoned haptic keyboard 146 may include a back lighting layer 168. The back lighting layer 168 may be used to provide backlighting through the keyboard overlay 166 to increase the visual appeal of the zoned haptic keyboard 146 as well as provide visual contrast for each key on the zoned haptic keyboard 146. In an embodiment, the back lighting layer 168 may be placed between the keyboard overlay 166 and the zoned haptic plate 172 with each of these layers being secure to each other via a glue or other adhesive. In an embodiment, the layers described herein may be close enough to allow the vibrations from the zoned haptic actuators 160-1, 160-2, 160-3, 160-n and haptic zone sections of the zone haptic plate 172 to pass from the zoned haptic plate 172 and to the keyboard overlay 166 so that the user may feel the haptic feedback at a correct sensor zone 164-1, 164-2, 164-3, 164-n that corresponds to haptic zones of the zoned haptic keyboard. As such, the back lighting layer 168 may be thin enough to provide the backlighting while not being so thick so as to prevent the haptic feedback from reaching the user's fingers placed on the keys formed in the keyboard overlay 166.

In an embodiment, a support plate 176 may be placed below the zoned haptic plate 172. The support plate 176 may be used to support the remaining layers within the zoned haptic keyboard 146. Additionally, the support plate 176 may allow for the zoned haptic keyboard 146 to be secured into a housing of, for example, a laptop-type information handling system 100.

In an embodiment, the disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 154 to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102. EC 104, or GPU 154 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102, and other hardware components described herein. The PMU 122 may control power to one or more components including the one or more drive units 120, the hardware processor 102 (e.g., CPU), the EC 104, the GPU 154, a video/graphic display device 144, or other wired I/O devices 142 such as the stylus 148, a mouse 152, the zoned haptic keyboard 146, and a trackpad 150 and other components that may require power when a power button has been actuated by a user. In an embodiment, the PMU 122 may monitor power levels and be electrically coupled, either wired or wirelessly, to the information handling system 100 to provide this power and coupled to bus 118 to provide or receive data or machine-readable code instructions. The PMU 122 may regulate power from a power source such as a battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
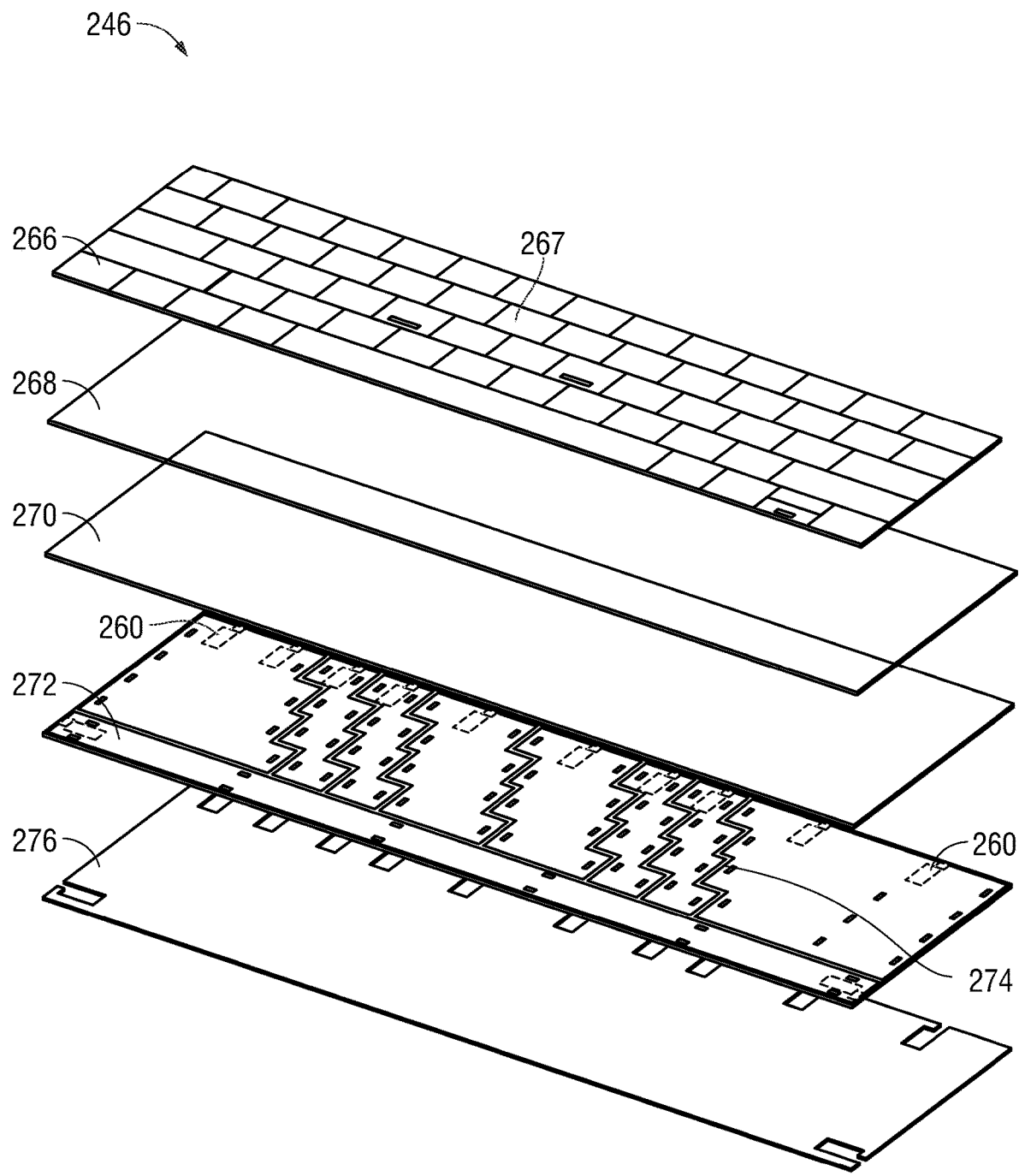
FIG. 2 is a perspective, exploded view of a zoned haptic keyboard according to an embodiment of the present disclosure.

FIG. 2 is a perspective, exploded view of a zoned haptic keyboard 246 according to an embodiment of the present disclosure. The exploded view in FIG. 2 shows the different layers and devices formed within the zoned haptic keyboard 246 in an embodiment. In an embodiment, these layers and devices may form part of a built-in keyboard in, for example, a laptop-type information handling system. In another embodiment, these layers and devices may form part of a wired zoned haptic keyboard operatively coupled to the information handling system via a wired connection (e.g., a USB cable inserted into a USB port of the information handling system). In another embodiment, these layers and devices may form part of a wireless zoned haptic keyboard operatively coupled to the information handling system via a wireless connection using a wireless radio (not shown) formed into the housing of the wireless keyboard.

As described herein, the zoned haptic keyboard 246 includes a keyboard overlay 266. The keyboard overlay 266 may be made of, for example, molded glass, silicone, or plastic. The surface of the keyboard overlay 266 that a user interacts with may include raised portions that define each individual key 267 of the zoned haptic keyboard 246. In an embodiment, the keyboard overlay 266 may include raised portions that define each key 267. In an example embodiment, these plurality of keys may be arranged in a QWERTY-type layout as described herein. Again, the present specification contemplates that other key layouts and in other alphanumerical languages may be used. Other layouts may include an American National Standards Institute (ANSI) layout (e.g., 101/104 ANSI and 101/104 ANSI variant), an International Organization Standardization (ISO)/International Electrotechnical Commission (IEC) layout (e.g., 102/105 ISO), a Korean Standard (KS) layout (e.g., 103-106 KS), a Brazilian layout (e.g., 104/107 ABNT), or a Japanese Industrial Standard (JIS) (e.g., 106/109 JIS), among other layouts used for other countries and languages.

The zoned haptic keyboard 246 may, in an embodiment, include a back lighting layer 268. Again, the back lighting layer 268 may be used to provide backlighting through the keyboard overlay 266 to increase the visual appeal of the zoned haptic keyboard 246 as well as provide visual contrast for each key on the zoned haptic keyboard 246. In an embodiment, the back lighting layer 268 may include a light source, such as a light emitting diode, operatively coupled to a light guide material that, when the light source is activated, directs light up and through keyboard overlay 266 or portions of the keyboard overlay 266 that have keys 267 and form the zoned haptic keyboard typing surface.

In some embodiments, the zoned haptic keyboard 246 includes a force sensing layer 270. The force sensing layer 270 may include any layer that is capable of detecting the actuation of a key by a user at the keyboard overlay 266 with application of force on that key 267 driving a keystroke. In an embodiment, the force sensing layer 270 may include a force sensing integrated circuit (not shown) that includes a plurality of force sensors or a force sensing film. In an embodiment, these force sensors may include a strain gauge.

Each of the plurality of strain gauges may include a metallic foil that, when deformed, causes a change in the electrical resistance to change across the metallic foil. Detection of this change in resistance indicates to a keyboard controller (not shown) that the key 267 under which the strain gauge is placed has been actuated by the user. In another embodiment, the force sensors may be a force sensing film. This force sensing film, in an embodiment, may include a pressure sensor array that includes a pressure sensor placed under each of the keys 267 formed in the keyboard overlay 266 to detect pressure or force placed on those keys 267 by the user. In another embodiment, the force sensing film may include a force sensing resistive film that includes an array of force sensitive resistors placed under each key 267 formed in the keyboard overlay 266. Each of the force sensing resistors may detect force or pressure placed at each key 267 by the user. In another embodiment, the force sensing layer 270 may include an array of piezo-resistive-based force sensors that are each placed under a key 267 of the keyboard overlay 266. Each of the piezo-resistive-based force sensors may detect the force applied by a user at each key 267. In other embodiments, the force sensing layer 270 may include an array of capacitive force sensors with each of the capacitive force sensors placed below each key 267 in the keyboard overlay 266 to detect a change in capacitance levels via the user's fingers during keystroke actuation. It is appreciated that whatever force sensing sensor used to detect a user's actuation of a key 267, these sensors may provide this input to the force sensing IC (e.g., FIG. 1, 162) which relays this input to the keyboard controller (e.g., FIG. 1, 153) for use as both input to the information handling system of a keystroke as well as providing input to a haptic device controller to cause the activation of the zoned haptic actuators 260 for haptic zone sections of a zoned haptic plate 272 as described herein.

It is appreciated that, where present, the force sensing layer 270 may be divided into individual sheets of the force sensing layer 270 in one embodiment for each haptic zone. These individual pieces of the force sensing layer 270 may match the haptic zones formed across the zoned haptic keyboard 246. For example, as indicated by the plurality of haptic barriers 274 defining haptic zone sections of the zoned haptic plate 272 that correspond to the haptic zones, the individual portions of the force sensing layer 270 may match the layout of each haptic zone. An adhesive may be used to secure the individual pieces of the force sensing layer 270 to their respective haptic zones in the keyboard overlay 266 or to the haptic zone sections of the zoned haptic plate 272.

The zoned haptic keyboard 246 may further include a zoned haptic plate 272. The zoned haptic plate 272 may be a substrate that holds each of the zoned haptic actuators 260 at their respective haptic zone sections under the haptic zones of the keyboard overlay 266. In an embodiment, the zoned haptic plate 272 have plural haptic zone sections may be made of a material such as a metal. The metal haptic zone sections of the zoned haptic plate 272 may be semi-flexible to allow each zoned haptic actuator 260 to apply a force against the respective haptic zone sections while also allowing for vibration to occur so that the user may feel the haptic feedback after actuation of a key 267 in the haptic zone of the zoned haptic keyboard 246.

Each haptic zone section of the zoned haptic plate 272 includes at least one zoned haptic actuator 260 for each haptic zone. In an embodiment, some or all of the haptic zone sections may include a plurality of zoned haptic actuators 260 operatively coupled for those haptic zones of the zoned haptic keyboard 246 that are relatively larger. As described herein for example, a user's pinky finger may be responsible, when using touch-typing, for actuating the a, z, q. 1, ', tab, caps, shift, and Ctrl key in a finger touch zone that corresponds to a larger haptic zone in the zoned haptic keyboard 246. Not only does this haptic zone of keys 267 include more keys 267 than some other haptic zones, the size of these keys 267 and the area of the zoned haptic keyboard 246 they encompass is larger than other haptic zones formed across the zoned haptic keyboard 246. In an embodiment, this haptic zone may include multiple zoned haptic actuators 260 to provide sufficient haptic feedback to these larger haptic zones so that a user may feel this haptic feedback that simulates the feel of the actuation of any of these keys 267 in this haptic zone.

In an embodiment, each of the zoned haptic actuators 260 may include a linear resonant actuator (LRA). The LRA may receive a signal from a haptic device controller (e.g., FIG. 1, 156), via a haptic booster (e.g., FIG. 1, 158) in one example embodiment, to be activated based on the input a force sensor on the force sensing layer 270 for a key 267 as described herein. The LRA includes a suspended voice coil in the presence of a magnetic flux field that, when a current is applied to the voice coil, causes a mass to be displaced thereby creating a vibration resulting in the haptic feedback felt by the user. In an embodiment, the haptic feedback may be generated at the surface of the keyboard overlay 266 and the zoned haptic keyboard 246. In an embodiment, the haptic feedback may be normal or planar to the surface of the keyboard overlay 266 and the zoned haptic keyboard 246.

In an embodiment, each of the zoned haptic actuators 260 may include a piezoelectric actuator. The piezoelectric actuator may receive a signal from a haptic device controller (e.g., FIG. 1, 156), via a haptic booster (e.g., FIG. 1, 158) in one example embodiment to be activated based on the input at a force sensor associated with each key of the keyboard overlay 266. In an embodiment, with the inclusion of the piezoelectric actuators as the zoned haptic actuators 260, the force sensing layer 270 may not be necessary and the force detected at the piezoelectric actuator may serve as the input force detection at any given key within a haptic zone as well as zoned haptic actuator 260 in an embodiment. With the inclusion of the force sensing layer 270 with a force sensing piezoelectric actuator, however, the piezoelectric actuator may be an in-plane actuator allowing for the haptic vibration of the piezoelectric actuator to happen in-plane with the haptic zone section of the zoned haptic plate 272 corresponding to the haptic zone having the actuated key.

In an embodiment, each of the zoned haptic actuators 260 may include a voice coil. In this embodiment, unlike the LRA, the voice coil may move a mass directly instead of the voice coil being used to cause a magnet to move a mass. As such, in some embodiments, the voice coil may be smaller allowing for additional space within the zoned haptic keyboard 246.

The zoned haptic plate 272 may include haptically isolated locations or haptic zone sections where the zoned haptic actuators 260 are operatively coupled. The embodiment shown in FIG. 2 shows the zoned haptic actuators 260 being located, generally, at an end or side portion of the individual haptic zone sections of zoned haptic plate 272. It is appreciated that although FIG. 2 shows a single zoned haptic actuator 260 formed at most of these haptic zone sections, a plurality of zoned haptic actuators 260 may be placed in some of these haptic zone sections of zoned haptic plate 272. This is shown in FIG. 2 where those haptic zone sections that are assigned to key groupings of haptic zones for keyboard overlay 266 actuated by a user's pinky or thumbs each include two zoned haptic actuators 260. Again, this is due to the physical area across the zoned haptic keyboard 246 that these haptic zone sections cover as well as the number of keys 267 on the zoned haptic keyboard 246 that are to be actuated via the user's pinky and thumb in these haptic zones.

The zoned haptic plate 272 further includes a plurality of haptic barriers 274 that physically divide each of the haptic zone sections of zoned haptic plate 272 from each other. The haptic barriers 274 may be formed between the haptic zone sections of the zoned haptic plate 272 to cushion or isolate each of the plurality of haptic zone sections. The haptic barriers 274 may be made of vibration absorbing material such as an elastomer. The haptic barrier 274, in one embodiment, may be used to prevent the haptic feedback produced by each of the zoned haptic actuators 260 at their respective haptic zone sections from being felt by the user at another haptic zone corresponding to another haptic zone section of the zoned haptic plate 272. For example, the haptic barrier 274 may be formed between a haptic zone section of zoned haptic plate 272 for those keys in a group that are to be pressed by the user's left hand pointer finger in a first haptic zone and another haptic zone section of the zoned haptic plate 272 for those key in a group that are to be pressed by a user's right hand pointer finger in a second haptic zone when engaged in touch-typing on the zoned haptic keyboard 246.

The zoned haptic keyboard 246 further includes a support plate 276. Again, the support plate 276 may be used to support the remaining layers within the zoned haptic keyboard 246. Additionally, the support plate 276 may allow for the zoned haptic keyboard 246 to be secured into a housing of, for example, a laptop-type information handling system on an external keyboard. Moreover, the support plate provides for stiffness and structural support for the zoned haptic plate 272 which may be less structurally stiff across multiple haptic zone sections due to the interstitial haptic barrier 274 between those sections which may comprise an elastomer.

Figure 3:
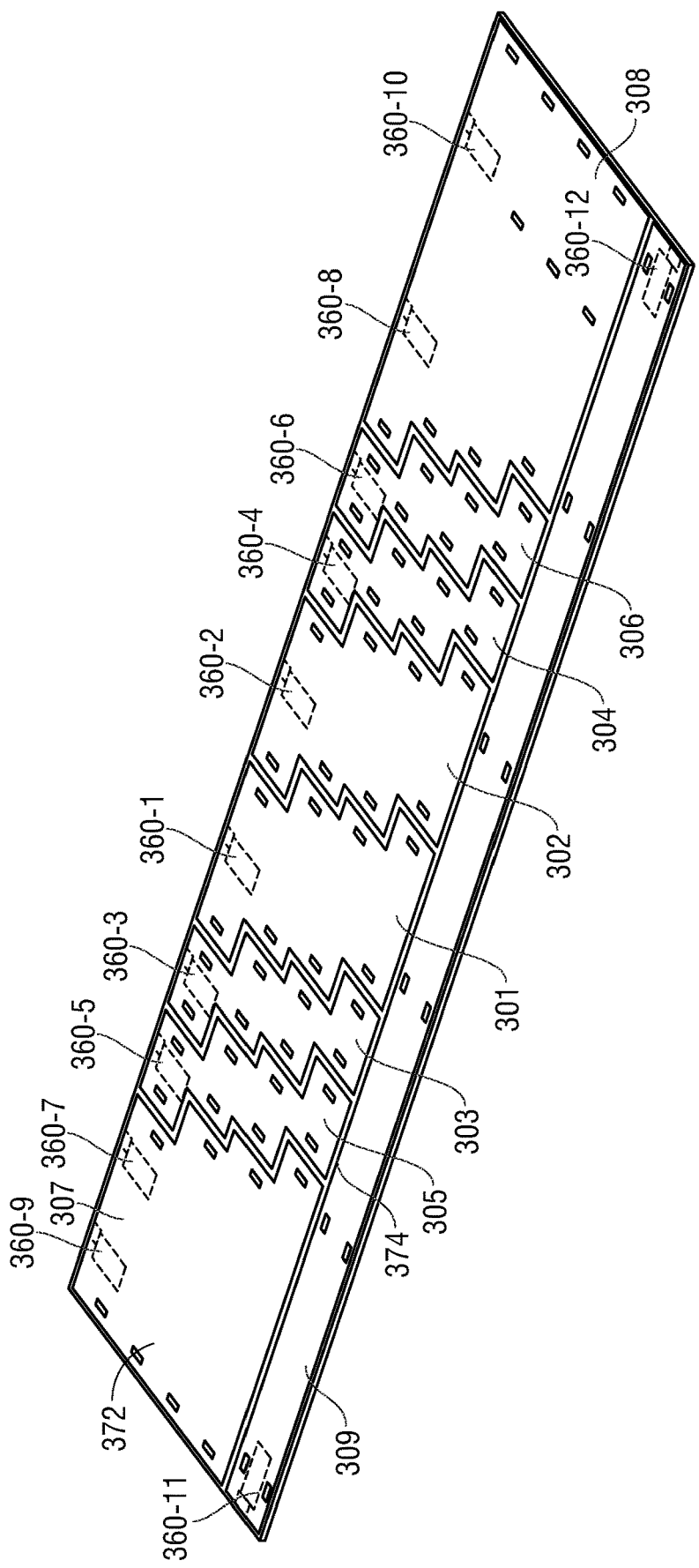
FIG. 3 is a perspective view of a zoned haptic plate according to an embodiment of the present disclosure.

FIG. 3 is a perspective view of a zoned haptic plate according to an embodiment of the present disclosure. As described herein, the zoned haptic keyboard may include a zoned haptic plate 372. The zoned haptic plate 372 may be a substrate that holds each of the zoned haptic actuators 360-1 through 360-12 at their respective locations of haptic zone sections 301, 302, 303, 304, 305, 306, 307, 308, and 309 under the haptic zones of the zoned haptic keyboard. In an embodiment, the haptic zone sections 301, 302, 303, 304, 305, 306, 307, 308, and 309 of the zoned haptic plate 372 may be made of a material such as a metal. In an embodiment, the first haptic zone section 301 may include a first zoned haptic actuator 360-1, the second haptic zone section 302 includes a second zoned haptic actuator 360-2, the third haptic zone section 303 includes a third zoned haptic actuator 360-3, a fourth haptic zone section 304 includes a fourth zoned haptic actuator 360-4, a fifth haptic zone section 305 includes a fifth zoned haptic actuator 360-5, and a sixth haptic zone section 306 includes a sixth zoned haptic actuator 360-6. In the embodiment, a seventh haptic zone section 307 includes a plurality of zoned haptic actuators 360-7 and 360-9. As described herein, the multiple zoned haptic actuators 360-7 and 360-9 in the seventh haptic zone section 307 are used to provide haptic feedback within a haptic zone section 307 that is relatively larger than the other haptic zone sections of the zoned haptic plate 372 described herein. Similarly, an eighth haptic zone section 308 includes a plurality of zoned haptic actuators 360-8 and 360-10. As described herein, the multiple zoned haptic actuators 360-8 and 360-10 in the eighth haptic zone section 308 are used to provide haptic feedback within a haptic zone section 308 that is relatively larger than the other haptic zone sections of the zoned haptic plate 372 described herein. Not only, in this example embodiment, is this eighth haptic zone section 308 encompassing a relatively larger surface area across the zoned haptic keyboard, this eighth haptic zone section 308 may include more individual keys in a group of the haptic zone it supports. Additionally, a ninth haptic zone section 309 includes a plurality of zoned haptic actuators 360-11 and 360-12. As described herein, the multiple zoned haptic actuators 360-11 and 360-12 in the ninth haptic zone section 309 are used to provide haptic feedback within a haptic zone section 309 that is relatively larger than the other haptic zone sections of zoned haptic plate 372 described herein. The metal haptic zone sections 301, 302, 303, 304, 305, 306, 307, 308, and 309 of the zoned haptic plate 372 may be semi-flexible to allow each zoned haptic actuator 360-1 through 360-12 to apply a force against the respective haptic zone sections 301, 302, 303, 304, 305, 306, 307, 308, and 309 while also allowing for vibration to occur so that the user may feel the haptic feedback after actuation of a key on the zoned haptic keyboard in the corresponding haptic zone group of keys.

Additionally, the zoned haptic plate 372 further includes a plurality of haptic barriers 374 that physically divide and haptically isolate each of the haptic zone sections 301, 302, 303, 304, 305, 306, 307, 308, and 309 from each other. The haptic barriers 374 may be formed between each haptically isolated haptic zone section 301, 302, 303, 304, 305, 306, 307, 308, and 309. The haptic barriers 374 may be made of a vibration absorbing material such as an elastomer. The haptic barrier 374, in an embodiment, is used to prevent the haptic feedback produced by each of the zoned haptic actuators 360-1 through 360-12 within their respective haptic zone sections under corresponding haptic zones from being felt by the user at another haptic zone on the zoned haptic keyboard. For example, the haptic barrier 374 may be formed between the haptic zone section 301 formed under those keys that are to be pressed by the user's left hand pointer finger and the haptic zone section 302 formed under those keys that are to be pressed by a user's right hand pointer finger when engaged in touch-typing on the zoned haptic keyboard.

FIG. 3 shows an exemplary layout of the zoned haptic actuators 360-1 through 360-12 in their respective haptic zone sections that are haptically isolated. In the embodiment shown in FIG. 3 the number of haptic zones matches the groupings of keys on the keyboard overlay that are to be actuated by a finger in a finger touch zone of a user engaged in touch-typing. Touch typing is a style of typing that, when executed properly by the user, uses a single finger to actuate a zone of keys (e.g., a finger touch zone). For example, on a QWERTY-type keyboard, a user may place their fingers along a home row of keys with the pointer finger of the user's left hand resting on the "f-key" and the pointer finger of the user's right hand resting on the "j-key." The rest of the fingers will rest on the remaining "home-row" keys (e.g., left hand fingers at the f, d, s, and a keys and right-hand fingers at the j, k, l and ; keys). This aligns each finger with their appropriate zone of keys in a finger touch zone on this QWERTY-type keyboard. It is these zones of keys that, in an example embodiment, correspond to the haptic zones where at least one of the plurality of zoned haptic actuators 360-1 through 360-12 for at least one haptic zone section 301, 302, 303, 304, 305, 306, 307, 308, and 309 will provide haptic feedback to actuation of a key in that haptic zone. For example, the haptic zone for the user's left hand pointer finger includes the following keys: f, r, v, g, t, b, 4, and 5. This haptic zone, defined by these keys forms, in an example embodiment, a first haptic zone for a first haptic zone section 301 where a first zoned haptic actuator 360-1 is placed under these keys. During operation, therefore, where any of these keys in the first haptic zone are actuated by the user, this first zoned haptic actuator 360-1 may be activated to provide haptic feedback to the user across this first haptic zone via the first haptic zone section 301. This assignment of a single zoned haptic actuator 360-1 through 360-12 or just two zoned haptic actuators to a single haptic zone significantly reduces the number of haptic actuators necessary to provide haptic feedback to the user thereby reducing the costs associated with manufacturing the zoned haptic keyboard as well as reduce the number of potential devices that may fail over time and use by the user.

As a second example, a second haptic zone may be formed at the user's right hand pointer finger. Because this finger is used to actuate the j, u, m, h, y n, 6, and 7 keys, this defines a second haptic zone formed across the keyboard. Again, this second haptic zone may also include a second zoned haptic actuator 360-2 operatively coupled to a second haptic zone section 302 of the zoned haptic plate 372. Thus, for each set of keys that any of each of the user's fingers are responsible to actuate in a touch-typing manner, a haptic zone is formed with each of these haptic zones including at least one zoned haptic actuator 360-1 through 360-12 operatively coupled to a haptic zone section 301, 302, 303, 304, 305, 306, 307, 308, and 309 of zoned haptic plate 372. The entire keyboard is partitioned by these haptic zones. The zoned haptic plate 372 is partition similarly by the haptic barrier 374 into haptic zone sections 301, 302, 303, 304, 305, 306, 307, 308, and 309. Each zone includes at least one zoned haptic actuators 360-1 through 360-12 used to provide haptic feedback to the user at the group of keys in that haptic zone. It can be seen, therefore, that there are nine haptic zone sections for nine haptic zones formed based on the nine touch-typing zones formed across the zoned haptic keyboard.

It is appreciated that some haptic zones partitioned across the zoned haptic keyboard may include more keys or cover more area of the keyboard than other haptic zones as described herein. For example, a user's left pinky finger may be responsible, when using touch-typing, for actuating the a, z, q, 1, ', tab, caps, shift, and Ctrl keys. Not only does this haptic zone of keys include more keys than some other haptic zones, the size of these keys and the area of the zoned haptic keyboard they encompass is larger than other haptic zones formed across the zoned haptic keyboard. In an embodiment, this haptic zone may include multiple zoned haptic actuators such as zoned haptic actuators 360-7 and 360-9 to provide sufficient haptic feedback to the larger haptic zone section 307 so that a user may feel this haptic feedback that simulates the feel of the actuation of any of these keys in this haptic zone formed over haptic zone section 307. A similar situation, as shown in FIG. 3, shows multiple zoned haptic actuators 360-8 and 360-10 placed for haptic zone section 308 under a haptic zone for keys actuated by a user's right-hand pinky. In another example, zoned haptic actuators 360-11 and 360-12 are operatively coupled to haptic zone section 311 for keys actuated by a user's thumb.

In the embodiment shown in FIG. 3, each of the zoned haptic actuators 360-1 through 360-12 may include an LRA, a voice coil, a piezoelectric actuator, and the like. The LRA may receive a signal from a haptic device controller (e.g., FIG. 1, 156) in an example embodiment to be activated based on the input at each of the force sensors on the force sensing layer (not shown) as described herein. The LRA includes a suspended voice coil in the presence of a magnetic flux field that, when a current is applied to the voice coil, causes a mass to be displaced thereby creating a vibration resulting in the haptic feedback felt by the user. In an embodiment, the haptic feedback may be normal to the surface of the keyboard overlay of the zoned haptic keyboard. In an embodiment, the haptic feedback may be planar to the surface of the keyboard overlay and the zoned haptic keyboard.

Figure 4:
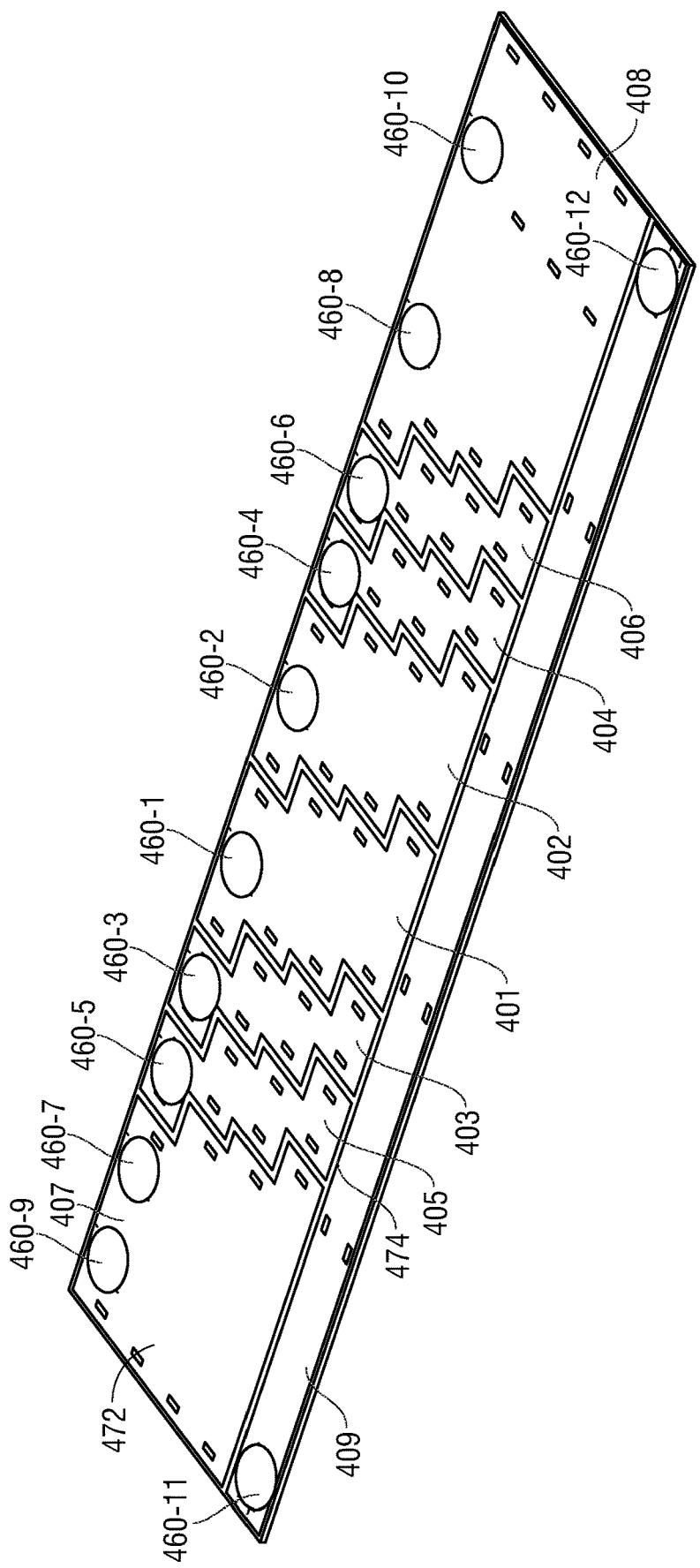
FIG. 4 is a perspective view of a zoned haptic plate according to another embodiment of the present disclosure.

FIG. 4 is a perspective view of a zoned haptic plate 472 according to another embodiment of the present disclosure. Again, the number of haptic zones matches the groupings of keys on the keyboard overlay that are to be actuated by a finger at a finger touch zone of a user engaged in touch-typing. Touch-typing is a style of typing that, when executed properly by the user, uses a single finger to actuate a zone of keys. This aligns each finger with their appropriate zone of keys on a QWERTY-type keyboard. It is these zone of keys that form the haptic zones where at least one of the plurality of zoned haptic actuators 460-1 through 460-12 operatively coupled to haptic zone sections 401, 402, 403, 404, 405, 406, 407, 408, and 409.

It is appreciated that the haptic zone sections 401, 402, 403, 404, 405, 406, 407, 408, and 409 partitioned by the haptic barrier 474 between them across the zoned haptic keyboard such that the haptic zone sections 401, 402, 403, 404, 405, 406, 407, 408, and 409 are haptically isolated to haptically isolate the haptic zones of the zoned haptic keyboard similar to the embodiment of FIG. 3 above. Some haptic zones may include more keys or cover more area of the zoned haptic keyboard than other haptic zones as described herein. For example, a user's left pinky finger may be responsible, when using touch-typing, for actuating the a, z, q, 1, ', tab, caps, shift, and Ctrl keys. Not only does this haptic zone of keys include more keys over haptic zone section 407 than some other haptic zone sections, the size of these keys and the area of the zoned haptic keyboard they encompass is larger than other haptic zones formed across the zoned haptic keyboard. In an embodiment, this haptic zone section 407 may include multiple zoned haptic actuators such as zoned haptic actuators 460-7 and 460-9 to provide sufficient haptic feedback to the larger haptic zone so that a user may feel this haptic feedback that simulates the feel of the actuation of any of these keys in this haptic zone formed over haptic zone section 407. A similar situation, as shown in FIG. 4, shows multiple zoned haptic actuators 460-8 through 460-10 placed with haptic zone section 408 for keys actuated by a user's right-hand pinky. In another example, zoned haptic actuators 460-11 and 460-12 are operatively coupled to haptic zone section 411 for keys actuated by a user's thumb. In an embodiment, the first haptic zone section 401 may include a first zoned haptic actuator 460-1, the second haptic zone section 402 includes a second zoned haptic actuator 460-2, the third haptic zone section 403 includes a third zoned haptic actuator 460-3, a fourth haptic zone section 404 includes a fourth zoned haptic actuator 460-4, a fifth haptic zone section 405 includes a fifth zoned haptic actuator 460-5, and a sixth haptic zone section 406 includes a sixth zoned haptic actuator 460-6.

In the embodiment shown in FIG. 4, each of the zoned haptic actuators 460-1 through 460-12 may include a piezoelectric actuator. The piezoelectric actuator may receive a signal from a haptic device controller (e.g., FIG. 1, 156) in an example embodiment to be activated based on the input at each of a force sensor associated with each key of the keyboard overlay of the zoned haptic keyboard. In one embodiment, with the inclusion of the piezoelectric actuators as the zoned haptic actuators 460 may also be force sensing. The force sensing layer 470 may not be necessary and the force detected at the piezoelectric actuator 460 may serve as the input detection at any given key actuated within a haptic zone as well as operate a zoned haptic actuator 460 to generate haptic feedback. With the inclusion of the force sensing layer 470 with a piezoelectric actuator, however, the piezoelectric actuator allows for the haptic vibration of the piezoelectric actuator to happen normal to the plane of the zoned haptic plate 472 with the corresponding haptic zone section of the zoned haptic plate 472. It is appreciated that, where various types of zoned haptic actuators may be used as described herein (e.g., LRAs, voice coils, piezoelectric actuators, etc.), the amount of haptic feedback created by these different types of zoned haptic actuators may help to determine how many zoned haptic actuators 460-1 through 460-12 are assigned to each haptic zone. For example, zoned haptic actuators 460-1 through 460-12 that are LRAs may require less zoned haptic actuators than if the zoned haptic actuators 460-1 through 460-12 are piezoelectric actuators.

Figure 5:
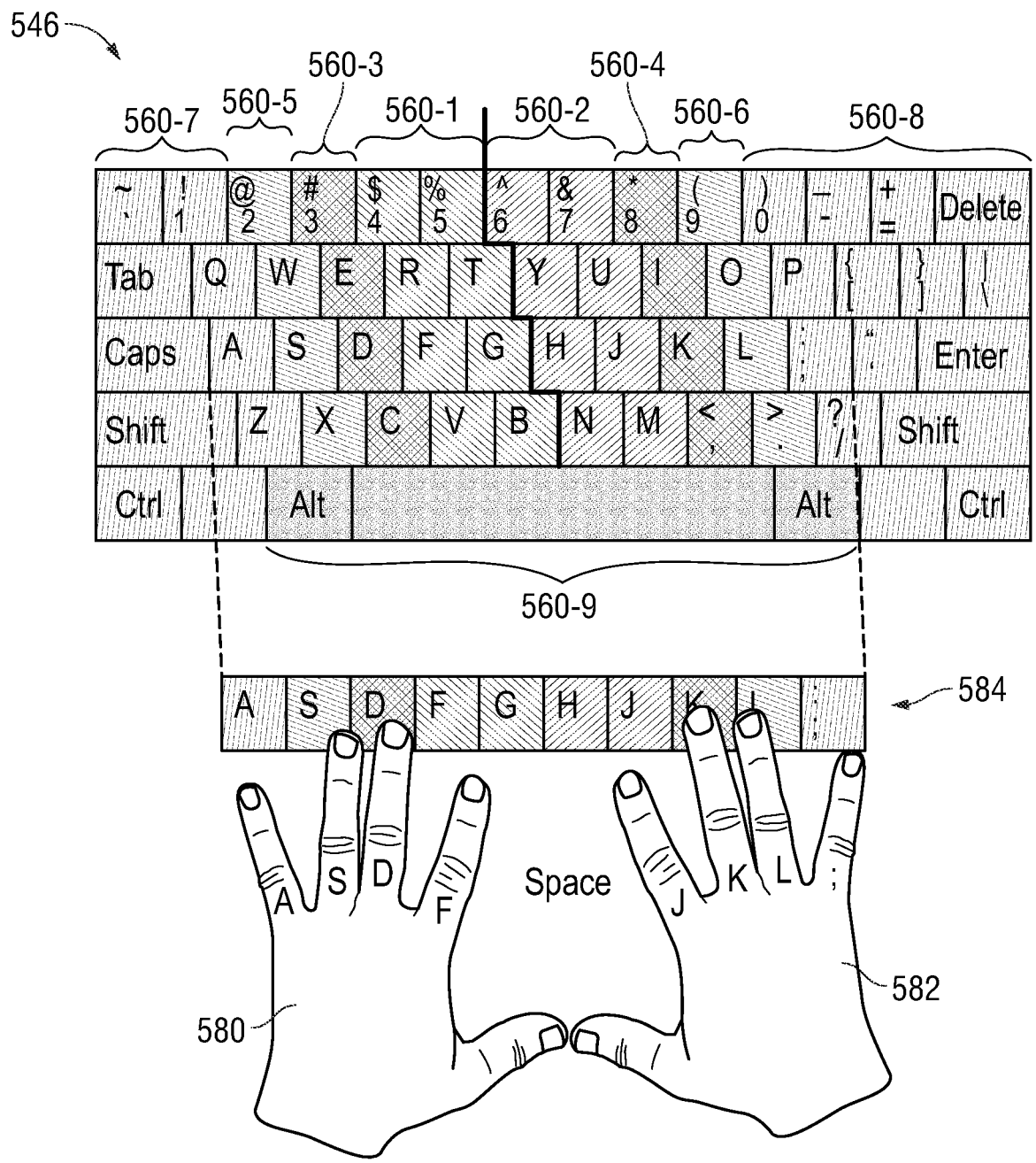
FIG. 5 is a planar view of an arrangement of keys of a keyboard of a QWERTY-type keyboard with reference to a user's finger placement for zones of a zoned haptic keyboard according to an embodiment of the present disclosure.

FIG. 5 is a planar view of an arrangement of keys of a zoned haptic keyboard 546 of a QWERTY-type keyboard with reference to a user's finger placement at individual finger touch zones of keys according to an embodiment of the present disclosure. FIG. 5 shows a user's left hand 580 and user's right hand 582 placed at home key row 584 of a QWERTY-type keyboard. Again, the user's fingers are placed at specific keys on the home key row 584 as a resting location used while executing touch-typing. As described herein, the keys on the zoned haptic keyboard 546 that are to be touched by any individual finger at individual finger touch zones of keys define the haptic zones 560-1 through 560-9 formed across the zoned haptic keyboard 546. For example, a first haptic zone 560-1 is formed or defined by the keys assigned to be actuated by a user's left index finger. These keys include, in this example, an f, r, v, 4, g, t, b, and 5-key and therefore defines the first haptic zone 560-1. This process is repeated for the other haptic zones described herein. For example, the keys of the second haptic zone 560-2 are actuated by a user's right-hand index finger and include keys h, y, n, 6, j, u, m, and 7. Still further, the keys of the third haptic zone 560-3 are actuated by a user's left-hand middle finger and include keys d, e, c, and 3. Even further, the keys of the fourth haptic zone 560-4 are actuated by a user's right-hand middle finger and include keys k, i, and 8. Further, the keys of the fifth haptic zone 560-5 are actuated by a user's left-hand ring finger and include keys s, x, w, and 2. Additionally, the keys of the sixth haptic zone 560-6 are actuated by a user's right hand ring finger and include keys 1 . . . o, and 9. Still further, the keys of the seventh haptic zone 560-7 are actuated by a user's left-hand pinky and include the a, z, q, 1', tab, caps, shift, and ctrl keys. Still further, the keys of the eighth haptic zone 560-8 are actuated by the user's right-hand pinky and include the ;, /, p, ', [, 0, -,], =, \, delete, enter, shift, and ctrl keys. And the keys of the ninth haptic zone 560-9 are actuated by a user's thumbs and include the space bar and the alt key. Having formed these haptic zones 560-1 through 560-9 based on grouping of keys in a finger-touch zone on this exemplary QWERTY-type zoned haptic keyboard 546, the haptic barriers (e.g., FIG. 3, 374) and the placement of the zoned haptic actuators (e.g., FIG. 3, 360-1 through 360-12) may be placed onto the zoned haptic plate to form haptic zone sections of the zone haptic plate haptically isolated from one another as described herein.

Figure 6:
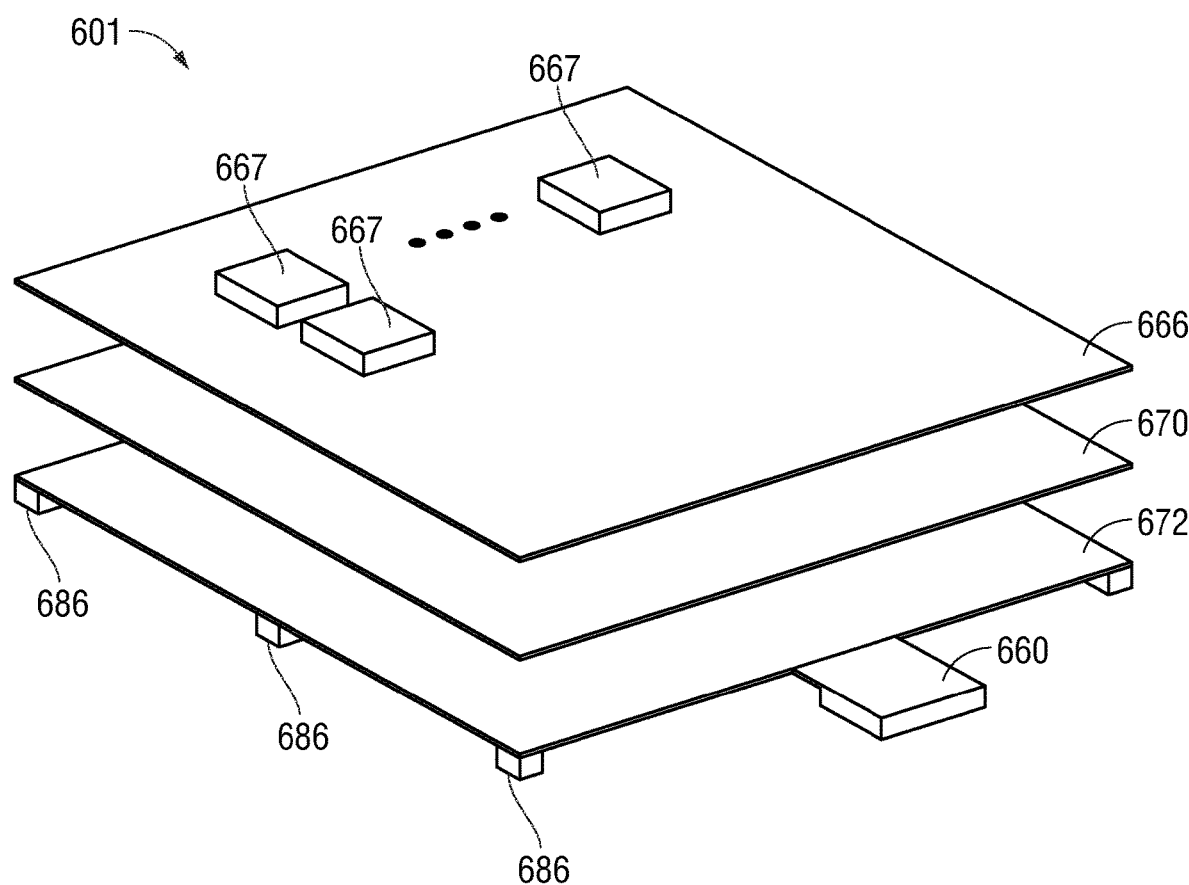
FIG. 6 is a perspective, exploded view of a haptic zone portion of a zoned haptic keyboard according to an embodiment of the present disclosure.

FIG. 6 is a perspective, exploded view of a haptic zone portion of a zoned haptic keyboard according to an embodiment of the present disclosure. This haptic zone of a zoned haptic keyboard includes a keyboard overlay 666, a force sensing layer 670, and a haptic zone section of the zoned haptic plate 672 as described in connection with, for example, FIG. 2. As described herein, the keyboard overlay 666 may be made of, for example, molded glass, molded silicone, or molded plastic. The surface of the keyboard overlay 666 that a user interacts with may include raised portions that define each individual key 667 of the zoned haptic keyboard. Additionally, the force sensing layer 670 may be placed intermediate to the keyboard overlay 666 and the zoned haptic plate 672.

The haptic zone section of the zoned haptic plate 672 includes one or more flexible supports 686. The zoned haptic plate 672 may be a substrate that holds each of one or more zoned haptic actuators 660 for a haptic zone section of the zoned haptic plate for each designated haptic zones of the zoned haptic keyboard. In an embodiment, each haptic zone section of the zoned haptic plate 672 may be made of a material such as a metal with haptic barriers around the edge of each haptic zone section (not shown), such as made of vibration absorbing material including elastomer, in the zoned haptic plate 672 separating the metal haptic zone sections. The metal of each haptic zone section of the zoned haptic plate 672 may be semi-flexible to allow each zoned haptic actuator 660 to apply a force against the respective haptic zones while also allowing for vibration to occur so that the user may feel the haptic feedback after actuation of a key on the zoned haptic keyboard. The flexible supports 686 may interface the zoned haptic plate 672 with a support plate (e.g., FIG. 2, 276). By placing these flexible supports 686 between the zoned haptic plate 672 and the support plate, the zoned haptic actuator 660 is allowed to vibrate on the haptic zone section of the zoned haptic plate 672 with the zoned haptic plate 672 moving slightly to allow for this vibration but not haptically actuate the support plate.

Figure 7:
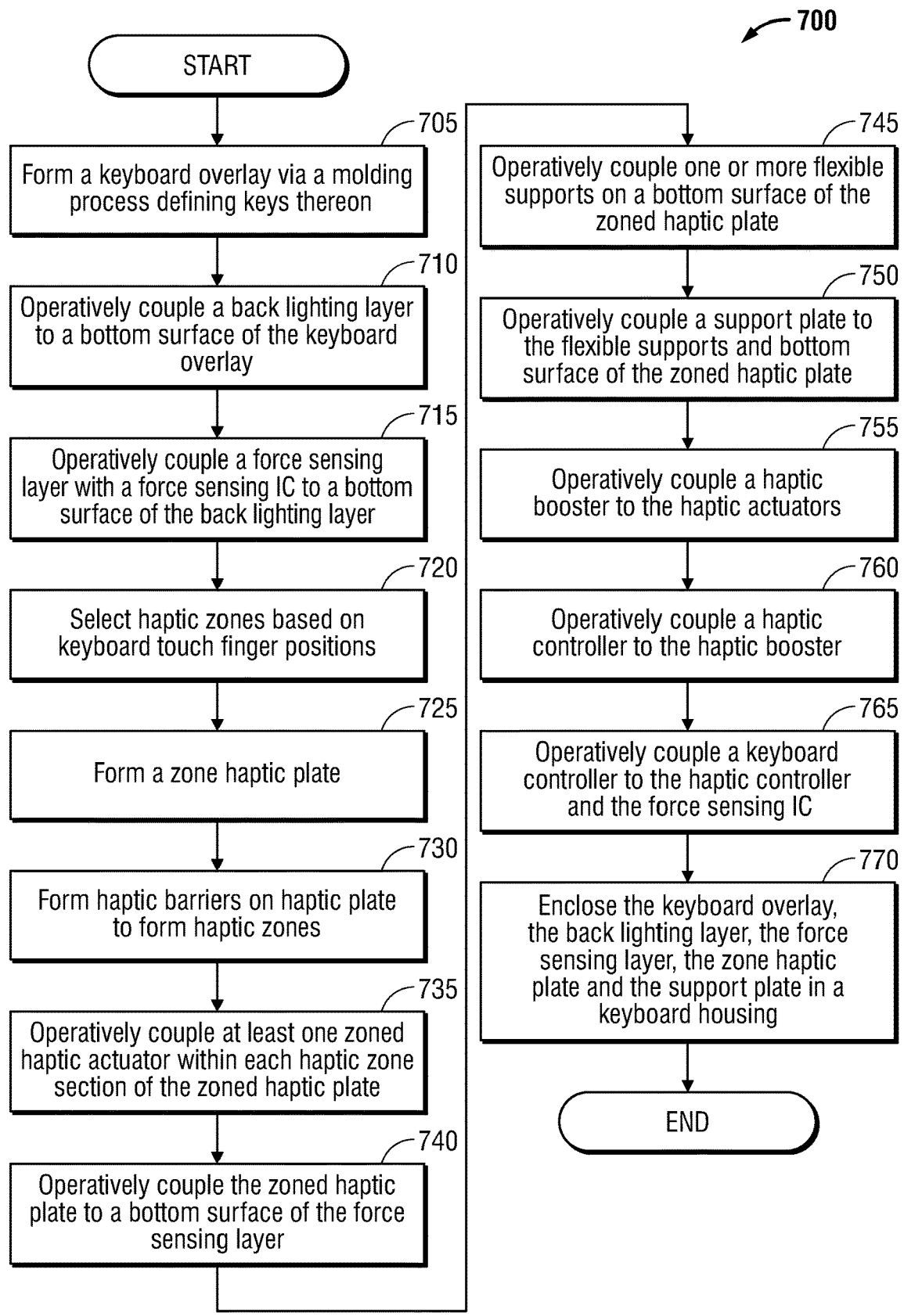
FIG. 7 is a flow diagram illustrating a method of manufacturing a zoned haptic keyboard according to an embodiment of the present disclosure.

FIG. 7 is a flow diagram illustrating a method 700 of manufacturing a haptic keyboard according to an embodiment of the present disclosure. The method 700 may include, at block 705, forming a keyboard overlay via a molding process. In an embodiment, this molding process may include molding silicone, glass, or plastic in a mold to define a plurality of keys shaped on the keyboard. In an example embodiment, these plurality of keys may be arranged in a QWERTY-type layout as described herein. Again, the present specification contemplates that other key layouts and in other alphanumerical languages may be used.

At block 710 the method 700 includes operatively coupling a back lighting layer to a bottom surface of the keyboard overlay. This process, in an embodiment, may be optional where the keyboard does not include a back lighting feature. In an embodiment, the back lighting layer may be coupled to the bottom surface of the keyboard overlay via use of a glue or other adhesive. The backlighting layer may include one or more light source and a light transmissive material to direct light under keys of the keyboard overlay layer.

At block 715, the method 700 includes operatively coupling a force sensing layer to a bottom surface of the back lighting layer. In an embodiment, the force sensing layer includes a force sensing IC that includes an array of any type of force sensor described herein. The sensors may be any type of device that detects the actuation of a key by user. In an embodiment, these force sensors may form part of a force sensing IC that receives input from the force sensors or force sensing film and transmits this data to the keyboard controller. The force sensing IC and the force sensors or force sensing film may be formed onto a force sensing layer that is placed below the keyboard overlay and the individual keys formed on the keyboard overlay. The force sensing layer may be any substrate or set of substrate layers that positions each of the sensors or force sensing film under each key so that, when actuated by a user, the actuation of a key is detected within a sensor zone for that haptic zone of the zoned haptic keyboard. In an embodiment, these force sensors may include strain gauges, force sensing films, piezo-resistive-based force sensors, capacitive force sensors, and resistive force sensors, among other types of force sensors.

At block 720, the method 700 includes selecting the haptic zones based on keyboard touch fingers. As described herein, the haptic zones may be defined by the finger touch location for each of multiple fingers on groups of keys for a zoned haptic keyboard used by a user when engaging in touch-type on the QWERTY-type zoned haptic keyboard. Touch typing is a style of typing that, when executed properly by the user, uses a single finger to actuate a particular zone of keys and this may define a finger touch zone to coincide with a haptic zone. The present specification contemplates that other types of keyboard layouts and zoning of the haptic zones may be formed and the principles described herein equally applies to these other types of keyboard layouts and formed haptic zones.

At block 725, the method 700 includes forming a zoned haptic plate. The zoned haptic plate may be a substrate that holds each of the zoned haptic actuators at respective locations with separate haptic zone sections with separate haptic zones for the zoned haptic keyboard as described herein. In an embodiment, the zoned haptic plate may be made of a material such as a metal for each haptic zone section. The metal of the zoned haptic plate may be semi-flexible to allow each zoned haptic actuator to apply a force against the respective haptic zone sections while also allowing for vibration to occur so that the user may feel the haptic feedback at haptic zone of keys after actuation of a key in that haptic zone on the zoned haptic keyboard.

At block 730, the method 700 includes forming haptic barriers in the haptic plate between haptic zone sections to form haptically isolated haptic zones. The haptic barriers may be made of any vibration absorbing material, such as an elastomer, in an embodiment. The haptic barrier, in an embodiment, may be used to prevent the haptic feedback produced by each of the zoned haptic actuators within their respective haptic zone sections of the zoned haptic plate from being felt by the user at another haptic zone in the zoned haptic plate. In an embodiment, these haptic zones may be defined by the finger-touch zones of keys used by a user when engaging in touch-type on the QWERTY-type keyboard. For example, on a QWERTY-type keyboard, a user may place their fingers along a home row of keys with the pointer finger of the user's left hand resting on the "f-key" and the pointer finger of the user's right hand resting on the "j-key." The rest of the fingers will rest on the remaining "home-row" keys (e.g., left hand fingers at the f, d, s, and a keys and right-hand fingers at the j, k, l and; keys). This aligns each finger with their appropriate finger touch zone of keys on this QWERTY-type keyboard that each finger will press during touch-typing. It is these finger-touch zone of keys that, in an example embodiment, will correspond to haptic zone section of the zoned haptic plate to form the haptic zones where one of the plurality of zoned haptic actuators are placed. For example, the haptic zone for the user's left hand pointer finger includes the following keys: f, r, v, g, t, b, 4, and 5. This haptic zone, defined by these keys forms, in an example embodiment, a first haptic zone section of the zoned haptic plate and isolated from other haptic zone sections by the haptic barrier elastomer or other vibration absorbing material. This first haptic zone section is where a first zoned haptic actuator may be placed under the keys to provide haptic feedback to that haptic zone. During operation, therefore, where any of these keys in the first haptic zone are actuated by the user, a first zoned haptic actuator may be activated to provide haptic feedback via the first haptic zone section to the user across this first haptic zone with isolation of the haptic feedback on other haptic zone sections of the zoned haptic plate. The haptic barriers may be formed between the haptic zone sections of the zoned haptic plate to isolate haptic feedback from other haptic zones of the zoned haptic keyboard. The haptic barrier, in an embodiment, may be used to prevent the haptic feedback produced by each of the zoned haptic actuators within their respective haptic zone sections from being felt by the user at another haptic zone of the zoned haptic keyboard. For example, the haptic barrier may be formed between those keys in a finger touch zone that are to be pressed by the user's left hand pointer finger and those keys in a different finger touch zone that are to be pressed by a user's right hand pointer finger when engaged in touch-typing on the zoned haptic keyboard.

The method 700 further includes, at block 735, operatively coupling at least one zoned haptic actuator at each haptic zone section formed by the placement of the haptic barriers in the zoned haptic plate. In an embodiment, some or all of the haptic zone sections may include a plurality of zoned haptic actuators in those haptic zone sections that are relatively larger. As described herein, for example, a user's pinky finger may be responsible, when using touch-typing, for actuating the a, z, q, 1, ', tab, caps, shift, and Ctrl keys in a larger finer touch zone than an index finger. Not only does this haptic zone of keys include more keys than some other haptic zones, the size of these keys and the area of the keyboard they encompass is larger than other haptic zones formed across the zoned haptic keyboard. In an embodiment, this haptic zone may include multiple zoned haptic actuators at a haptic zone section of the zoned haptic plate to provide sufficient haptic feedback to these larger zones so that a user may feel this haptic feedback that simulates the feel of the actuation of any of these keys in this haptic zone. As described herein, each of the zoned haptic actuators may include an LRA, a piezoelectric actuator, a voice coil, and the like.

At block 740, the method 700 includes operatively coupling the zoned haptic plate to a bottom surface of the force sensing layer. Similar to the coupling of other layers described herein, the zoned haptic plate may be operatively coupled to the bottom surface of the force sensing layer using a glue or other adhesive. In an embodiment where the force sensing layer is separated into portions that match the haptic zones formed by the haptic barriers, this adhesive may be used to not only secure the force sensing layer to the zoned haptic plate but also secure the zoned haptic plate to other vertically-positioned layer such as the back lighting layer and/or the keyboard overlay.

At block 745, the method 700 may further include operatively coupling one or more flexible substrates to a bottom surface of the zoned haptic plate. The flexible supports may interface the zoned haptic plate with a support plate. By placing these flexible supports between the zoned haptic plate and the support plate, the zoned haptic actuator is allowed to vibrate on the zoned haptic plate with the zoned haptic plate moving slightly to allow for this vibration while not imparting haptic vibration into the support plate. As such, at block 750, a support plate made of metal or plastic is operatively coupled to the flexible supports and a bottom surface of the zoned haptic plate.

At block 755, the method 700 includes operatively coupling a haptic booster to the haptic actuators formed on the zoned haptic plate. The haptic booster may be any device that boosts the voltage provided to each of the zoned haptic actuators. The haptic booster (also known as a flyback circuit) may increase the voltage applied to each of the zoned haptic actuators so that the proper amount of haptic feedback is felt by the user at each of the haptic zones within the keyboard. The haptic booster may be an optional component in some embodiments.

At block 760, the method 700 further includes operatively coupling a haptic controller (e.g., a hardware processing device used to haptically control the zoned haptic actuators) to the haptic booster or to the haptic actuators as well as to the force sensing IC. The haptic controller may be controlled based on the data received from each of the force sensors formed on the force sensing layer and associated with the force sensing IC.

At block 765, the method 700 includes operatively coupling a keyboard controller to the haptic controller and the force sensing IC. The keyboard controller is used to receive input from one or more force sensors for each key in a haptic zone. The force sensors may be any type of device or film that detects the actuation of a key by user as described in embodiments herein. In an embodiment, these sensors may form part of a force sensing IC that receives this input from the force sensors or film for an actuated key and transmits this data to the keyboard controller to record a keystroke.

The method 700 includes, at block 770, enclosing the keyboard overlay, the back lighting layer, the force sensing layer, the zone haptic plate and the support plate in a keyboard housing. In an embodiment, the keyboard housing may be part of a housing of a laptop-type information handling system. In another embodiment, the keyboard housing may be a specialized housing used to form a peripheral keyboard separate from the housing of the information handling system. The support plate may be mechanically affixed to the housing of the information handling system or peripheral keyboard. At this point, the method 700 may end.

The blocks of the flow diagrams of FIG. 7 or steps and aspects of the operation of the embodiments herein and discussed herein need not be performed in any given or specified order and zoned haptic layers may be in different order than discussed in the embodiments herein. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system having a zoned haptic keyboard, comprising:
   a hardware processor, a memory device, and a power management unit (PMU) to provide power to the hardware processor and memory device;
   the zoned haptic keyboard comprising:
      a haptic zone plate partitioned into a plurality of planar haptic zone sections of the haptic zone plate, wherein a first haptic zone section of the zoned haptic plate is haptically isolated from a plurality of other haptic zone sections planar to the first haptic zone section of the haptic zone plate by an embedded planar haptic zone barrier structure integrated into a plane of the haptic zone plate between the first haptic zone section and at least one of the plurality of other haptic zone sections of the zoned haptic plate for the zoned haptic keyboard;
      a keyboard controller to transmit key actuation data to the hardware processor indicating a key of a plurality of keys within the keyboard is detected as being actuated by a user as a keystroke;
      a force sensing integrated circuit (IC) to detect force data at one of a plurality of force sensors formed within a first haptic zone of a plurality of haptic zones corresponding to the first haptic zone section of the plurality of haptic zone sections of the haptic zone plate and the plurality of haptic zones partitioned across an area of the zoned haptic keyboard to detect actuation of the key; and
      a haptic device controller to receive instructions to activate, based on the force data received at the keyboard controller from the force sensing IC identifying the first haptic zone including the key actuated, a first zoned haptic actuator operatively coupled to the first haptic zone section of the haptic zone plate corresponding to the first haptic zone to provide haptic feedback to the user within the first haptic zone where the force data was detected on the key.

2. The information handling system of claim 1 further comprising:
   the first zoned haptic actuator is a zoned linear resonant actuator (LRA) operatively coupled to the haptic zone section of the zoned haptic plate to generate creating a haptic force at a surface of the zoned haptic keyboard in the first haptic zone.

3. The information handling system of claim 1 further comprising:
the first zoned haptic actuator is a zoned piezoelectric actuator operatively coupled to the haptic zone section of the zoned haptic plate that creates a haptic force at a surface keyboard overlay of the zoned haptic keyboard in the first haptic zone.

4. The information handling system of claim 1 further comprising:
the first zoned haptic actuator is a zoned voice coil operatively coupled to the haptic zone section of the zoned haptic plate and creates a haptic force at a surface of the zoned haptic keyboard in the first haptic zone.

5. The information handling system of claim 1 further comprising:
the force sensing IC including a force sensing layer substrate to hold the force sensing IC and the plurality of force sensors, the force sensing layer substrate formed between a keyboard overlay and a zoned haptic plate, wherein the keyboard overlay includes molded keys of the keyboard and the zoned haptic plate is used to hold the zoned haptic actuators within the keyboard for haptic actuators of the plurality of haptic zones across the zoned haptic keyboard.

6. The information handling system of claim 1 further comprising:
a plurality of embedded planar haptic zone barrier structures formed between the plurality of planar haptic zone sections in the zoned haptic plate, the embedded planar haptic zone barrier structures outlining the physical boundaries of the plurality of haptic zone sections of the zoned haptic plate to haptically isolate the plurality of haptic zones partitioned across the area of the zoned haptic plate for the zoned haptic keyboard, wherein the embedded planar haptic zone barrier structures prevent haptic feedback at the first haptic zone corresponding to the first planar haptic zone section from being felt at a second haptic zone corresponding to a second haptic zone section of the zoned haptic plate among the plurality of haptic zones partitioned across an area of the keyboard.

7. The information handling system of claim 1 further comprising:
the zoned haptic plate includes a plurality of planar metal haptic zone sections in a plane of the zoned haptic plate, wherein the embedded planar haptic zone barrier structure is an elastomer haptic barrier structure formed in the plane of the zoned haptic plate between the plurality of metal haptic zone sections.

8. A zoned haptic keyboard, comprising:
a haptic zone plate partitioned into a plurality of planar haptic zone sections of the haptic zone plate, wherein a first planar haptic zone section of the zoned haptic plate is haptically isolated from a plurality of other planar haptic zone sections and planar to the first haptic zone section of the haptic zone plate by an embedded planar haptic zone barrier structure integrated into a plane of the haptic zone plate between the first planar haptic zone section and at least one of the plurality of other planar haptic zone sections of the zoned haptic plate for the zoned haptic keyboard;
a keyboard controller to transmit key actuation data to a hardware processor of an information handling system indicating a key within the keyboard was detected as being actuated by a user as a keystroke;
a force sensing integrated circuit (IC) to detect force data from actuation of the key at one of a plurality of force sensors formed within a first haptic zone corresponding to the first planar haptic zone section of a plurality of haptic zones corresponding to the plurality of other planar haptic zone sections of the zoned haptic plate such that the first haptic zone of the plurality of haptic zones are partitioned across an area of the zoned haptic keyboard; and
a haptic device controller to activate, in response to actuation of the key in a group of keys of the first haptic zone, a first zoned haptic actuator operatively coupled to the first planar haptic zone section of the zoned haptic plate that corresponds to the first haptic zone to provide haptic feedback at the key in the first haptic zone where the force data was detected.

9. The haptic keyboard of claim 8 further comprising:
the first zoned haptic actuator is a zoned linear resonant actuator (LRA) operatively coupled to the haptic zone section of the zoned haptic plate, the zoned LRAs each creating a haptic force at a surface of the keyboard in the first haptic zone.

10. The haptic keyboard of claim 8 further comprising:
the first zoned haptic actuator is a zoned piezoelectric actuator operatively coupled to the haptic zone section of the zoned haptic plate that creates a haptic force at the key on a surface of the keyboard in the first haptic zone.

11. The haptic keyboard of claim 8 further comprising:
the first zoned haptic actuator is a zoned voice coil operatively coupled to the haptic zone section of the zoned haptic plate that creates a haptic force on a surface of the keyboard in the first haptic zone.

12. The haptic keyboard of claim 8 further comprising:
the force sensing layer formed between a keyboard overlay and the zoned haptic plate, the keyboard overlay including molded keys of the keyboard and the zoned haptic plate used to hold the zoned haptic actuators within the keyboard.

13. The haptic keyboard of claim 8 further comprising:
a plurality of embedded planar haptic barrier structures formed into a plane of the zoned haptic plate between the plurality of planar haptic zone sections of the zoned haptic plate, the embedded planar haptic barrier structures formed of vibration absorbing material and outlining physical boundaries of each of the plurality of planar haptic zone sections of the zoned haptic plate to haptically isolate the plurality of haptic zones partitioned across the area of the zoned haptic keyboard.

14. The haptic keyboard of claim 8 further comprising:
the zoned haptic plate includes the plurality of planar haptic zone sections that are a plurality of planar metal haptic zone sections in the plane of the zoned haptic plate, wherein the embedded planar haptic zone barrier structure is an elastomer haptic barrier structure formed between each of the plurality of planar metal haptic zone sections of the zoned haptic plate.

15. The haptic keyboard of claim 8, wherein the plurality of haptic zones are a group of keys defined by a user's finger positions and keystrokes while executing touch-typing on a QWERTY keyboard.

16. A zoned haptic keyboard of an information handling system, comprising:
  a haptic zone plate partitioned into a plurality of planar haptic zone sections of the haptic zone plate, wherein a first planar haptic zone section of the zoned haptic plate is haptically isolated from a plurality of other planar haptic zone sections and planar to the first haptic zone section of the haptic zone plate by an embedded planar haptic zone barrier structure integrated into the haptic zone plate between the first planar haptic zone section and at least one of the plurality of other planar haptic zone sections of the zoned haptic plate for the zoned haptic keyboard;
  a keyboard controller to transmit key actuation data to the hardware processor indicating a key within the keyboard was detected as being actuated via force on the key as a keystroke; and
  a haptic device controller to activate, based on actuation data of the key within a group of keys designated as a first haptic zone of the zoned haptic keyboard, a first zoned haptic actuator of a plurality of zoned haptic actuators to provide haptic feedback to a user at the first haptic zone via the first planar haptic zone section of a plurality of planar haptic zone sections forming the partitioned a zoned haptic plate that supports the group of keys in the first haptic zone of the zoned haptic keyboard, wherein the embedded planar haptic zone barrier structure is made of a vibration absorbing material.

17. The zoned haptic keyboard of claim 16 further comprising:
  a first piezo-resistive-based force sensor formed between a keyboard overlay to sense force from the first haptic zone and the first piezo-resistive-based force sensor also operating as the first zoned haptic actuator for the first haptic zone of the zoned haptic keyboard.

18. The zoned haptic keyboard of claim 16 further comprising:
  the first zoned haptic actuator is a zoned linear resonant actuator (LRA) operatively coupled to the first haptic zone section of the zoned haptic plate, the zoned LRA creating a haptic force at a surface of the zoned haptic keyboard in the first haptic zone.

19. The zoned haptic keyboard of claim 16 further comprising:
  a keyboard overlay forming a surface including molded keys of the zoned haptic keyboard.

20. The zoned haptic keyboard of claim 19 further comprising:
  the zoned haptic plate includes the plurality of planar haptic zone sections that are a plurality of planar metal haptic zone sections in a plane of the zoned haptic plate, wherein the embedded planar haptic zone barrier structure is an elastomer haptic barrier structure formed into the plane of the zoned haptic plate between the plurality of planar metal haptic zone sections of the zoned haptic plate.

* * * * *